L. R. WRIGHT.
Corn Planter.
2 Sheets—Sheet 2.
No. 59,115.
Patented Oct. 23, 1866.
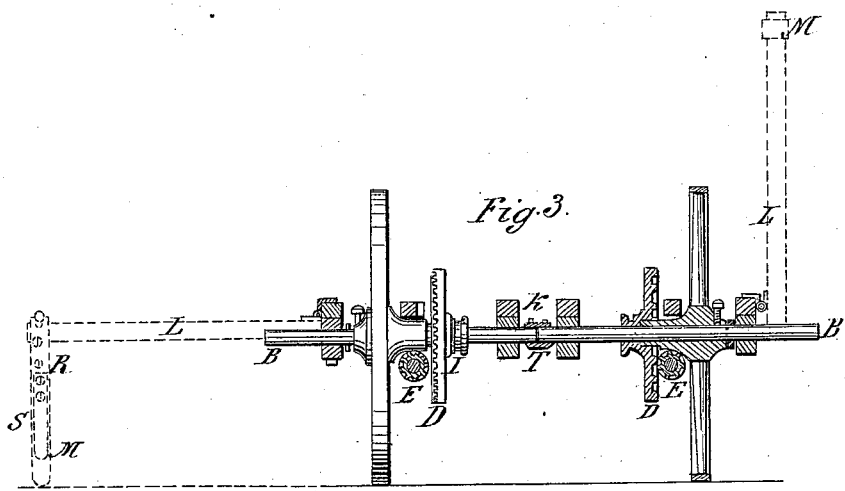
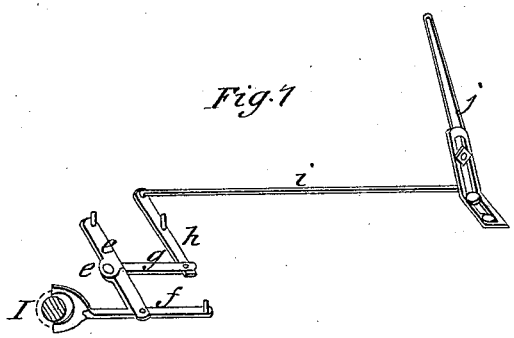
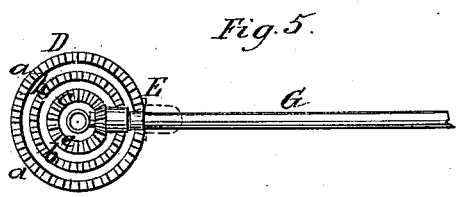
Witnesses:
R. A. Reille,
Marcus Norton
Inventor:
Lewis R. Wright

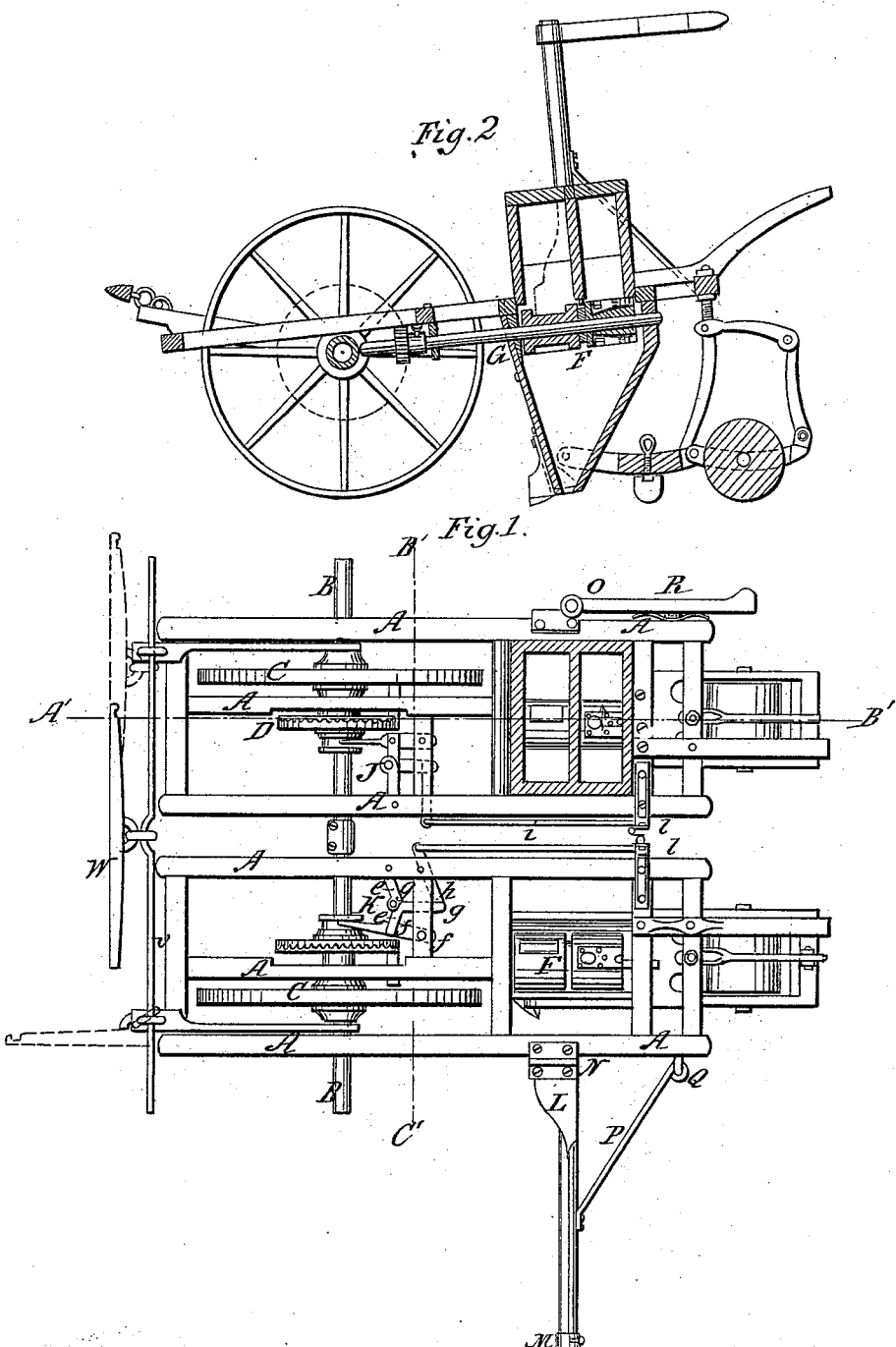

UNITED STATES PATENT OFFICE.

LEWIS R. WRIGHT, OF COHOES, NEW YORK.

IMPROVEMENT IN SEED-PLANTERS.

Specification forming part of Letters Patent No. 59,115, dated October 23, 1866.

*To all whom it may concern:*

Be it known that I, LEWIS R. WRIGHT, of the village of Cohoes, county of Albany, and State of New York, have invented certain new and useful Improvements in Seed-Planting Machinery; and I do hereby declare that the following is a full, clear, and exact description of the construction and operation of the same, reference being hereby had to the accompanying drawings, and to the letters of reference marked thereon, which said drawings make a part of this specification.

Like letters represent and refer to like or corresponding parts.

There are two sheets of drawings which accompany and form a part of this specification, which I denominate "Sheet 1" and "Sheet 2."

Figure 1, Sheet 1, is a plan or view of my said machine looking from the top downward, and showing the several improvements herein described and set forth. Fig. 2, same sheet, is a vertical view on the line A and B, and showing improvements hereinafter described. Fig. 3, Sheet 2, shows an elevation at the left hand and a vertical section at the right hand of improvements hereinafter fully described and set forth. Fig. 4 of Sheet 2 is a section on the line of C and D, Fig. 1, Sheet 1, and shows the levers, hereinafter described. Fig. 5 of Sheet 2 is a plan or elevation of cog-wheels and pinion, hereinafter described and set forth.

The nature of my said invention and improvements consists in the employment of a device, constructed and operated in the manner substantially as herein described and set forth, for the marking of a row parallel to adjoining row being planted by the machine, so that when the machine shall have passed the entire length of the field, and shall be made to recross the field in an opposite direction, it shall, by such marked row, be governed in its planting operation, whereby the said planted rows are made of equal and parallel distances between the same or apart from each other.

It also consists in the employment of certain levers constructed and operated in the manner substantially as herein described and set forth, so that the pinion by which the planting device or machinery is operated shall be put in and out of gear as circumstances may require, and when in gear, and the said planting machinery in operation thereby, the same shall be continued in gear, unless thrown out of gear by the person operating the machine.

It has heretofore been quite difficult to get a device which would hold the said pinion and gear-wheel in gear during the working of the machine and at the same time have the same free to be thrown out of gear at the will of the operator. This difficulty is now overcome and remedied by the said device, hereinafter described and set forth.

It also consists in the employment of two cylinders, which shall have upon the respective end or side surface thereof several sets of cogs, which shall form a series of circles of different diameters, into which the pinion which drives the planting cylinder or machinery therewith combined may be placed, whereby and by means of which the seed may be planted in hills in the rows at such distances between the same as the case may require, which is done in the manner and by the means substantially as hereinafter described and set forth.

There are several improvements shown by the accompanying drawings upon which I obtained Letters Patent of the United States bearing date the 16th day of April, 1861, and which need not here be described.

Having thus described the nature of my said invention and improvements, and to enable others skilled in the art to which the same relates to make and use my said improvements, I will here proceed to describe the construction and operation thereof, which is as follows, to wit:

A, Fig. 1, Sheet 1, is the frame, which I usually make of wood and in such shape and manner as will best contain the machinery or various parts of which my said planting-machine is composed, and of any required size or strength. This frame rests upon the axle B, same figure, and contains a bearing upon each side of the drive-wheels C, same figure, which wheels may be of any material, size, construction, or strength deemed best. At or near the rear end of such frame I construct the device or machinery which contains the seeds to be planted and by which such seeds are rightfully distributed in the furrow made for that purpose, in the manner substantially as specified and set forth in my said patent, dated as aforesaid, and to which reference is hereby had for a more full description of the devices or machinery by which the said seeds are distributed and planted in hills and rows.

On the drive-shaft B, Figs. 1 and 3, Sheets 1 and 2, I construct the cog-wheels D, Fig. 1, Sheet 1, and Figs. 3 and 5 of Sheet 2. Upon the vertical or side surface of this wheel I construct a series of cogs, as shown at $a$ $b$ $c$, Fig. 5, Sheet 2. The series of cogs thus represented are for the purpose of regulating the distance between the hills planted in the rows. If a greater distance is required, the pinion E, Figs. 3 and 5 of Sheet 2, is put into gear with the series of cogs $a$, Fig. 5, Sheet 2. If less distance between said hills is desirable, then the said pinion E is put into gear with the series of cogs $b$, Fig. 5, same sheet. If still less is desired, then the said pinion E is put into gear with the series of cogs $c$ on the said wheel D.

It will therefore be seen that the greater the speed of the planting-cylinders F, Figs. 1 and 2 of Sheet 1, the less will be the distance between the hills planted, and the less the speed of the said planting-cylinders the greater will be the distance between the hills planted. The said pinion E is so arranged upon the shaft G, Fig. 1, Sheet 1, and Fig. 5, Sheet 2, as to slide upon that end of such shaft near the said wheel D, so as to be easily put into gear with either of such series of cogs $a$ $b$ $c$ when required, and when thus put into gear it is made secure to the said shaft G by any suitable means by which the said shaft is made to revolve. At the opposite end of the said shaft G, I place the said planting-cylinder F, as shown at Figs. 1 and 2, Sheet 1, which cylinder contains the device which regulates the amount of seed to be put into each hill during the movement of the machine, which said dropping device and planting devices are fully described and set forth in my said patent.

To put into gear and retain in gear, and to put out of gear, the said wheel D and the said pinion E while the machine is in operation, I employ a series of levers, as shown in detail at Fig. 4, Sheet 2. $e$, Fig. 1, Sheet 1, and Fig. 4, Sheet 2, is a lever, with a joint near the center thereof, and having one end made secure to the said frame A by means of a pin or bolt, while the other end is connected to the lever $f$, same figure, at some suitable point. One end of the said lever $f$ is secured to the cross-piece H, Fig. 1, Sheet 1, while its other end is connected with the sliding cylinder I, Fig. 1, Sheet 1, and Figs. 3 and 4, Sheet 2. This sliding cylinder is firmly fastened to the said wheel B, containing the series of cogs $a$ $b$ $c$, and it slides upon the said shaft B when the said wheel and pinion are put into and out of gear by means of the said series of levers. To the joint in the said lever $e$, I connect the lever $g$, Fig. 1, Sheet 1, and Fig. 4, Sheet 2, one end of which lever is connected to the lever $h$, same figures.

The lever $h$ has a joint or bearing upon the frame A at any required place thereon. To the end of the lever $h$ opposite to lever $g$, I connect the rod $i$, same figure, which extends into and connects with the operator's lever $j$, same figures, in any suitable and desired manner.

When the said wheel D and the pinion E are in gear the said levers will be and remain during the operation of the machine in the position shown at said Fig. 4, and also as seen at J, Fig. 1, Sheet 1; and when the said wheel and pinion are out of gear, then the said levers will appear as shown at K, Fig. 1.

By this arrangement and combination of levers I am enabled to retain the pinion E in gear with said cog-wheel D during the operation or working of the said seed-planting machine, while, at the same time, the said pinion may at any time be thrown from gear by the operator by means of the said lever $j$, and during the onward movement of the said planting-machine, without any hinderance whatever. The action and operation of the said machine cannot, therefore, disconnect the said gear-wheels during the movement of the machine while planting, &c.

These levers may be constructed in any manner and of any material deemed best and of sufficient strength to answer the purpose required. The said cog-wheel and pinion will, of course, be constructed of any size and material required to carry out the purposes of the same, as aforesaid described.

In order to guide the said planting-machine in making the rows planted of equal and parallel distances from each other, I employ a device which, during the onward movement of the said machine across the field to be planted, shall mark upon the soil the next row to be planted, and then when the said machine returns to cross the same field the drive-wheel C, next the planted part of the said field, will follow in the place so marked, and thereby guide the machine in planting the rows as aforesaid. To make the said mark upon and into the soil, I employ the device L M, Fig. 1, Sheet 1, and Fig. 3, Sheet 2. The arm L is hinged to the frame A, as seen at N, Fig. 1, Sheet 1, and extends out from such frame to any required distance, and is of any material and strength deemed sufficient by the builder. This arm L is so hinged to such frame for the purpose of being folded up toward said frame when not required for use, as seen at $o$, Fig. 1, Sheet 1. It is firmly held in working position at right angles with the frame A by means of the brace P, and which has a joint at Q, same figure. This arm and marking device thereto attached will always be folded up toward the machine, as aforesaid, whenever that part of the machine to which the same are hinged shall be presented toward that portion of the field planted while the marking device upon the opposite side shall be in operation, making the mark in the soil for the purpose aforesaid upon that part of the field to be planted. To the outer end of said arm L, I construct the marking device M, which is made to move upon the arm L for the purpose of adjusting the distance between the rows to be planted, which when done is then securely fastened by any mechanical means which will answer the purpose. This device M, I usually make in two parts with a joint, as seen at R, Fig. 1, Sheet 1, and at Fig. 3, Sheet 2. This joint is for the purpose of allowing the said device to pass any obstructions, and at the same time continue its work of marking for the next row, as aforesaid. To bring it back and to retain it in its proper and required place after having passed any such obstructions, I employ a spring upon the back thereof, and shown at S, Fig. 3, Sheet 2, which is made of steel and of any required strength.

That end of said device by which the soil is marked may be of any form or shape desired. To make the said rows of less distance, between the same I move the said device M on the said arm L toward the said frame A, and for a greater distance apart I move said device M out from the said frame A; and when the desired distance between the rows is attained, I then securely fasten the said device to the said arm L, as aforesaid, so that whichever direction the machine moves across the field it will contain upon the proper side thereof a marking device in operation, as aforesaid, while that upon the opposite side will be folded up toward the machine.

The series of cogs aforesaid upon the vertical face of the said wheel or cylinder D, as well as those upon the pinion F, will be constructed in form or shape so as to operate with ease or free from obstruction.

This machine may be used double or single if desired—that is to say, one, two, or more rows may be planted at the same time and operation of the machine crossing the field. If but one row is planted, then I disconnect the drive-shaft B at T, Fig. 3, Sheet 2, where it is held connected by means of the outer cylinder, k, same figure, and by removing the cross-rod V, Fig. 1, Sheet 1.

The distance between the drive-wheels C will be adjusted to the desired distance between the rows to be planted, and will be the same distance as that made by the said marking device, as hereinbefore described and set forth.

The said shaft B is constructed of sufficient length and projection from each side of the frame A, so as to allow of greater or less diameter between said drive-wheels. There will then be a space between the ends of the shaft B, which are contained within the said outer cylinder, k, Fig. 3.

To keep that end of the said frame A which contains the dropping, planting, and covering devices at the distance required by the adjustment of the said drive-wheels, as aforesaid, I use the slides e e, Fig. 1, Sheet 1, which are held in the desired place by means of screws in the frame A.

Having thus described the construction and operation of my said seed-planting machine, what I claim, and desire to secure by Letters Patent, is—

1. The arrangement and combination of the levers e f g h with the sliding cylinder I and cog-wheel D, in the manner and for the purposes substantially as herein described and set forth.

2. The arrangement of a cog-wheel or cylinder, D, containing the series of cogs a b c upon or near each end of the drive-shaft B, and the shafts G G, containing the sliding pinions E E and the planting-cylinders F F, each being arranged and combined in the manner substantially as herein described and set forth.

3. The mode herein described and set forth for combining and disconnecting two or more seed-planting machines constructed and arranged substantially as herein described and set forth.

4. The employment of the marking device M, constructed and combined with the arm L, hinged to the frame A, in the manner substantially as herein described and set forth.

In testimony whereof I have on this 19th day of August, 1865, hereunto set my hand.

LEWIS R. WRIGHT.

Witnesses:
R. H. REILLE,
MARCUS P. NORTON.